United States Patent
Echols et al.

(10) Patent No.: US 10,964,316 B2
(45) Date of Patent: Mar. 30, 2021

(54) PERFORMING ACTION ON ACTIVE MEDIA CONTENT

(71) Applicant: Lenovo (Singapore) Pte. Ltd., Singapore (SG)

(72) Inventors: Roderick Echols, Chapel Hill, NC (US); Ryan Charles Knudson, Durham, NC (US); Timothy Winthrop Kingsbury, Cary, NC (US); Jonathan Gaither Knox, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/673,079

(22) Filed: Aug. 9, 2017

(65) Prior Publication Data

US 2019/0051296 A1 Feb. 14, 2019

(51) Int. Cl.
*G10L 15/00* (2013.01)
*G10L 15/22* (2006.01)
*G06F 3/16* (2006.01)
*G06F 40/40* (2020.01)

(52) U.S. Cl.
CPC .............. *G10L 15/22* (2013.01); *G06F 3/165* (2013.01); *G06F 3/167* (2013.01); *G06F 40/40* (2020.01); *G10L 2015/223* (2013.01)

(58) Field of Classification Search
CPC . G10L 15/22; G10L 15/265; G10L 2015/223; G06F 3/167; G06F 40/40; G06F 3/165; H04M 2201/40

USPC ......................................................... 704/275
See application file for complete search history.

(56) References Cited

U.S. PATENT DOCUMENTS

| | | | | |
|---|---|---|---|---|
| 6,535,850 B1* | 3/2003 | Bayya | ..................... | G10L 15/07 704/239 |
| 6,662,180 B1* | 12/2003 | Aref | ................. | G06F 17/30625 |
| 6,873,993 B2* | 3/2005 | Charlesworth | ... | G06F 17/30017 704/251 |
| 7,904,296 B2* | 3/2011 | Morris | ..................... | G10L 15/04 704/231 |
| 7,983,915 B2* | 7/2011 | Knight | .............. | G06F 17/30026 704/254 |
| 2010/0269145 A1* | 10/2010 | Ingrassia | ................ | H04H 20/24 725/110 |
| 2015/0254058 A1* | 9/2015 | Klein | ...................... | G06F 3/167 704/275 |
| 2015/0293597 A1* | 10/2015 | Mishra | .................... | G06F 1/163 715/810 |

* cited by examiner

*Primary Examiner* — Jesse S Pullias
(74) *Attorney, Agent, or Firm* — Ference & Associates LLC

(57) ABSTRACT

One non-limiting embodiment provides a method, including: receiving, from a user, user input comprising a trigger event; identifying, using at least one processor, active media content; and performing, based upon the trigger event, an action with respect to the active media content. This embodiment is intended to be non-limiting and other embodiments are contemplated, disclosed, and discussed.

20 Claims, 3 Drawing Sheets

PERFORMING ACTION ON ACTIVE MEDIA CONTENT

BACKGROUND

Advances in technology have increased the ways in which consumers obtain media content. Previously, consumers had a choice between live events, radio, or pre-recorded media such as vinyl records, 8-track tapes, cassettes, compact discs, or the like. Consumers now have new choices such as streaming media, for example, as delivered over an Internet connection, and satellite delivered media in audio form, video form, and/or in combination. Information handling devices ("devices") such as computers, tablets, smartphones, automotive stereos, TV streaming boxes, cable boxes, satellite boxes, or the like, are often capable of obtaining these new forms of media. Therefore, a consumer has a huge available library of available content at their fingertips at all times. It may be difficult for a consumer to keep track of the large amount of media available, and in particular, to keep track of preferred media that suits the consumer's preferences.

BRIEF SUMMARY

In summary, one aspect provides a method, comprising: receiving, from a user, user input comprising a trigger event; identifying, using at least one processor, active media content; and performing, based upon the trigger event, an action with respect to the active media content.

Another aspect provides an information handling device, comprising: a processor; at least one processor; a memory device that stores instructions executable by the processor to: receive, from a user, user input comprising a trigger event; identify, using at least one processor, active media content; and perform, based upon the trigger event, an action with respect to the active media content.

A further aspect provides a product, comprising: a storage device that stores code, the code being executable by a processor and comprising: code that receives, from a user, user input comprising a trigger event; code that identifies, using at least one processor, active media content; and code that performs, based upon the trigger event, an action with respect to the active media content.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
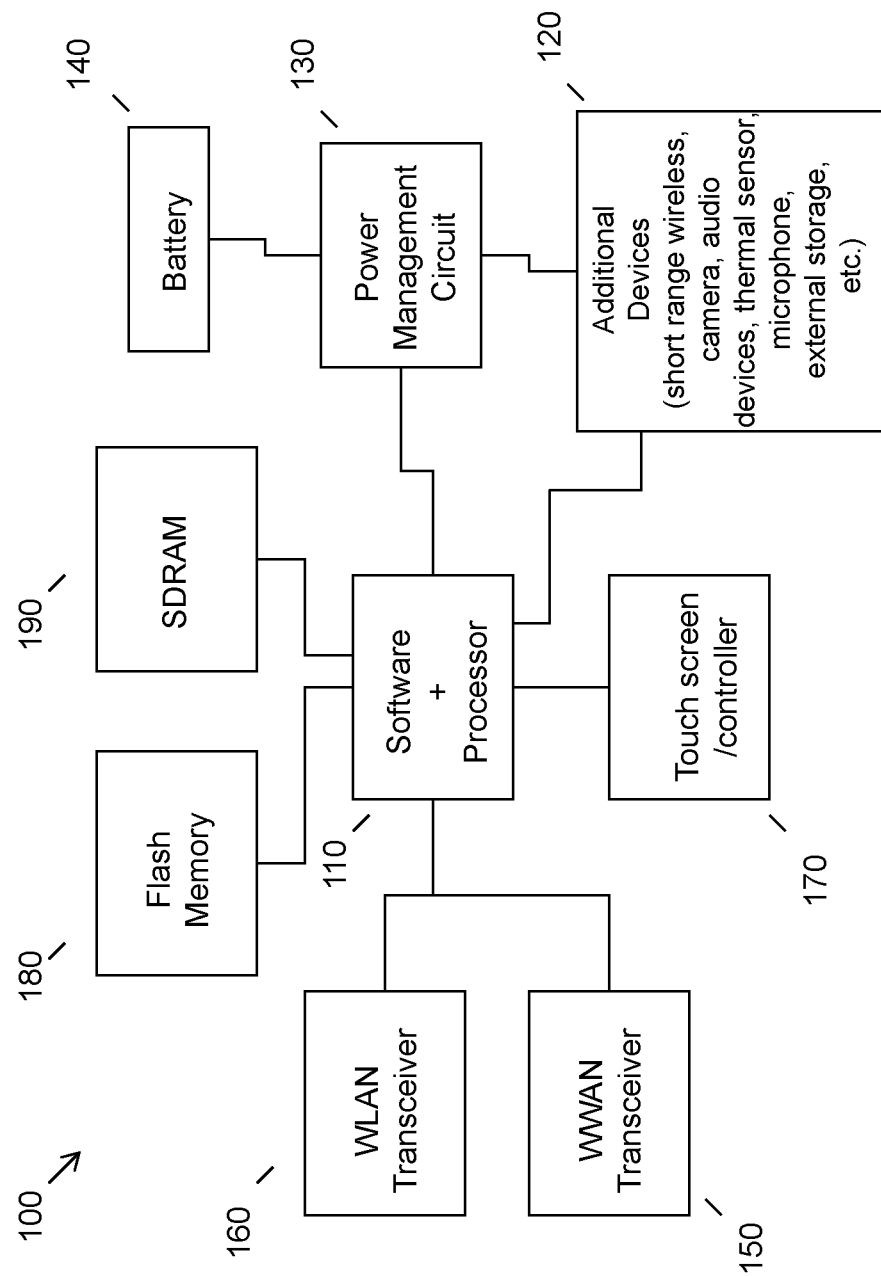
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently encounter large amounts of media in any given day, for example, people may listen to the radio, watch videos over the Internet, watch television programs, listen to news broadcasts, and the like. In today's fast paced life, a user may not have time to enjoy the media content at the time the media is being aired or played. For example, a driver of a car may be listening to a radio station and arrive at the desired destination before the program, song, or other audio content has completed. The driver may not have time to finish listening to the media content, but would like to finish or replay the media content at a later, more convenient time. As another example, a listener may be listening to satellite radio and hear new music that is currently not in the user's library. Additionally, the user may not have time to figure out the name, artist, or other identifying characteristics of the song. The user may wish to remember the song to listen to or to purchase at a later time. As an additional example, a user may be watching a television ("TV") program or may see a TV program that is coming on at a later time that they want to watch. However, the user may need to leave without having time to watch the show, set a reminder to record the show, or set the show to record. Nonetheless, the user may wish to do something to create a reminder to look for the show or start a recording before having to leave.

Conventionally, a user would resort to more labor intensive methods to retain the media for a later time. In a most basic form, a user may write down an attribute of the media (i.e. title, keyword, artist, channel, or the like), and search for the media at a later time. The search may be performed using an Internet search engine, or may be performed on the website of the channel of the media source. Technological developments such as the ability to "tag" a media file, such as a "like" function on a streaming service, for example, may retain a media file and alert a user of when the media may be played again. However, annoyingly the "like" functionality often suggests other related media which is tangential to the media the user really wants to remember. Also, a user may set a digital video recording (DVR) unit to save a media file for later use. However, this may require a user to find the program that they wish to record using a guide and then set the recorder to record the media. These methods require additional steps and time for a user to remember preferred media, to identify media files for a later time, or save media to be consumed at a later time.

Accordingly, an embodiment provides a system and method for performing an action with respect to active media content based upon receipt of a trigger event. A trigger event may be a word, action, gesture, departure from the area, gaze tracking, pressing a button, wireless communication, or the like. For ease and simplicity of reading, a trigger word is described; however, it should be understood that the term trigger word may refer to and be any of the disclosed trigger events. An embodiment may receive a trigger word from a user. The trigger event may comprise a command to "mark" the active media file for use at a later time. The trigger event may be preprogrammed in the system or the trigger event may be selected by the user. For example, a user may select the word "retain" as the trigger word. Once an embodiment has received the trigger word, an embodiment may identify the active media content. Identification of the active media may include identifying a particular audio media file, accessing a schedule, identifying a channel, identifying characteristics of the active media (e.g., title, artist, producer, network, etc.), and/or the like. An embodiment may then perform an action with respect to the active media content, for example, provide a notification, provide a reminder, record the active media content, subsequently play the active media content, input the active media at a virtual assistant, or the like.

As an example and using the example trigger word "retain", the user may be listening to an NPR radio program in the car and the program duration continues beyond the time that the user arrives at a destination. At this point, the user may say the trigger word "retain" and the in-progress active media may be selected or marked for listening at a later time. The selection or marking may include recording the content, sending a link to the user including the content, notifying the user when the content is being replayed or re-aired, or the like.

As another example, a trigger event may be a user exiting their automobile. A user may be listening to an NPR radio program in the car and the program duration continues beyond the time that the user arrives at a destination. At this point, the trigger event may be the exiting of the automobile, and the in-progress active media may be selected or marked for listening at a later time. The selection or marking may include recording the content, sending a link to the user including the content, notifying the user when the content is being replayed or re-aired, or the like.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
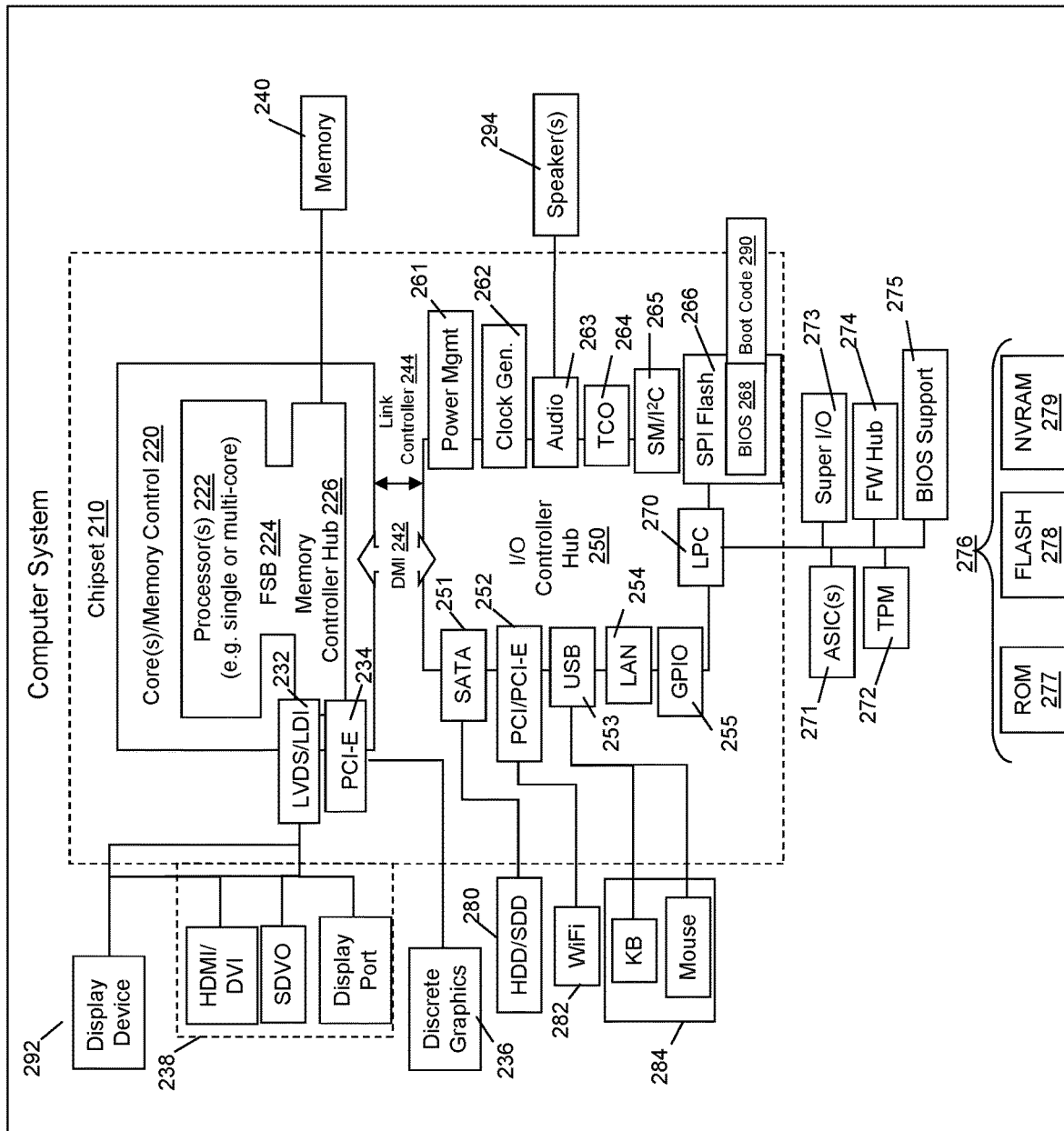
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, AR enabled headsets, personal computer devices generally, and/or electronic devices which may be used to consume active media content and/or may be used to identify active media content and perform an action responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
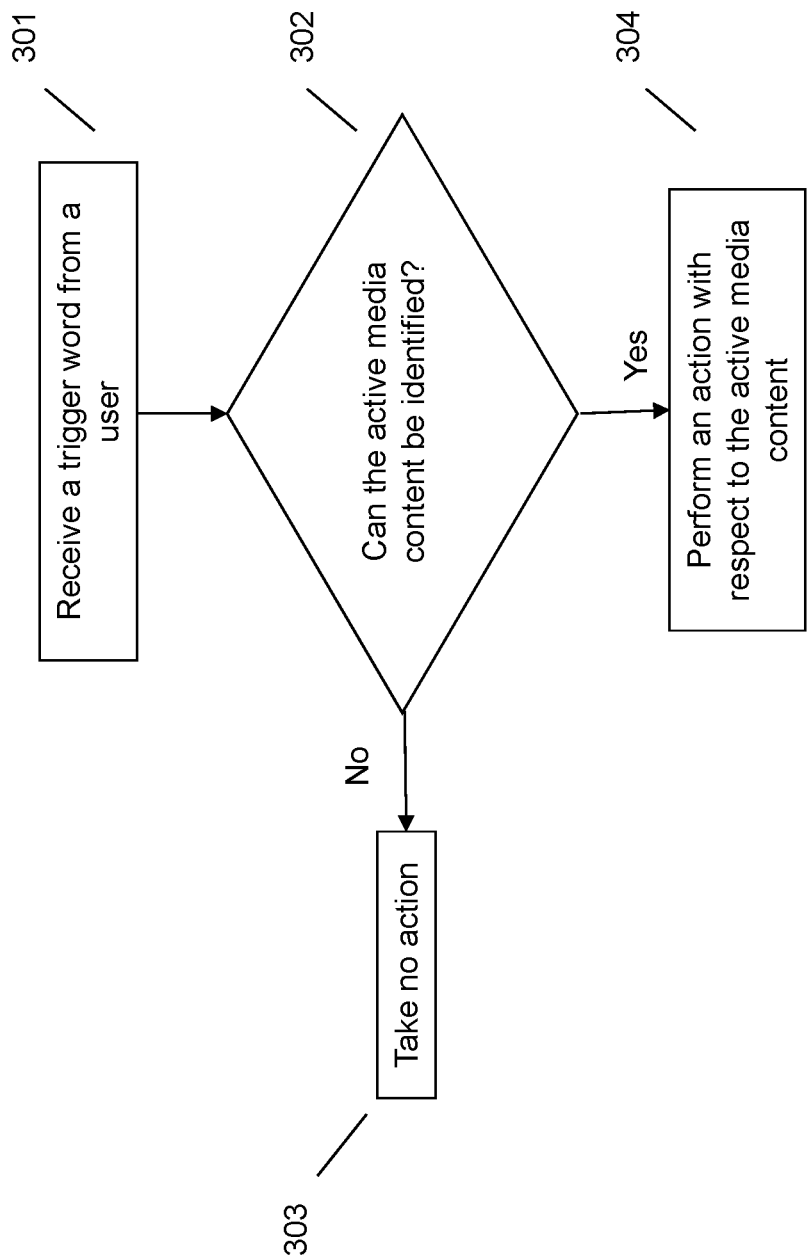
FIG. 3 illustrates an example method of performing an action with respect to active media content based upon receipt of a trigger event.

Referring now to FIG. 3, an embodiment may perform an action with respect to active media content based upon receipt of a trigger event performed or provided by a user. At 301, an embodiment may receive user input including a trigger word from a user. The trigger word may include one or more words, for example, the trigger word may include a phrase or multiple words rather than a single word. The trigger word may include an indication to an embodiment to perform a particular function, for example, to identify active media content and perform an action with respect to the active media content. The trigger word may cause an embodiment to mark or select active media content, as explained in more detail below.

In one embodiment, the trigger word may be a preset or default word or may be programmed by a user. For example, a user may choose a particular word or phrase to be used to cause an embodiment to perform the function. Different users may select or program different trigger words. For example, one user may prefer a trigger word "retain" while another user prefers the trigger word "keep this." Different trigger words for different users may reflect personal preferences of a user or help a device to differentiate between users. For example, an embodiment may identify which user to associate the active media content with based upon the trigger word used. Alternatively, an embodiment may identify the user using different identification methods, for example, user credentials, device association (e.g., a device is associated with a user, etc.), biometric identification (e.g., fingerprint recognition, facial recognition, retinal recognition, etc.), and the like.

An embodiment may also include multiple trigger words, each performing a different function with respect to the active media content. For example, a user may use the trigger word "save" to save the active media content and the trigger word "send" to send a link to the active media content to the user. Again, these multiple trigger words may be preset or may be selected by the user. Additionally, different users may use the same trigger word to perform different functions. For example, one user may use the trigger word "send" to send a link to the active media to an email address of the user and another user may use the trigger word "send" to send the active media file to a data storage location of the user. In an embodiment, the user input trigger word may be received at a virtual assistant and the virtual assistant may perform the requested function with respect to the active media content.

The input may be received at an input device (e.g., physical keyboard, on-screen keyboard, audio capture device, image capture device, video capture device, digital assistant, television tuner box, satellite radio unit, automobile entertainment unit, smartphone, etc.) and may be provided by any known method of providing input to an electronic device (e.g., touch input, text input, voice input, etc.). For simplicity purposes, the majority of the discussion herein will involve voice input that may be received at an input device (e.g., a microphone, a speech capture device, etc.) operatively coupled to a speech recognition device. However, it should be understood that generally any form of user input may be utilized. For example, a user may provide touch or mechanical input to an information handling device that triggers the device to take some action.

In an embodiment, the input device may be an input device integral to the speech recognition device. For example, a smart phone, digital assistant, stereo, TV, streaming box, or satellite radio unit may be disposed with a microphone capable of receiving voice input data. Alternatively, the input device may be disposed on another device and may transmit received voice input data to the speech recognition device. For example, voice input may be received at a smart speaker that may subsequently transmit the voice data to another device (e.g., to a user's smartphone for processing, etc.). Voice input data may be communicated from other sources to the speech recognition device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive voice input data by maintaining the input device in an active state. The input device may, for example, continuously detect voice input data even when other functions of the device (e.g., cameras, light sensors, speakers, other microphones, speakers, display screens, etc.) are inactive. Alternatively, the input device may remain in an active state for a predetermined amount of time (e.g., 30 minutes, 1 hour, 2 hours, etc.), or the device may "wake-up" in response to a trigger word or receipt of user input.

At 302, an embodiment may determine whether active media content can be identified. The active media content may be any type of media file, for example, songs, video, television programs, Internet podcasts, or any other type of media file. The media file may be active on different types of media sources, for example, radio, satellite radio, streaming media, subscription media, broadcast television, cable television, satellite television, or the like. The active media content may be from a commercial provider or personal source, for example, over-the-air radio stations, a user's MP3 player, Internet providers, a data storage location (e.g., remote storage, local storage, cloud storage, etc.), and the like. The active media content may also include live or prerecorded formats.

Active media content may include media content that is currently active or may include media content that was or will be active. In other words, in one embodiment, a user may say the trigger word and an embodiment may identify what media content is currently active (e.g., being aired, playing, currently audible, etc.). For example, if the user is travelling by car and listening to a radio program that is ongoing when the user reaches a destination, the user may say a trigger word and the system may identify the currently active media content in response to receiving the trigger word. As another example, a user may be watching a TV program, but needs to leave before completion of the program, the user may use the trigger word and the system may identify the currently active media content.

Alternatively, in one embodiment, if the user provides a trigger word that includes a specific time duration, time frame, or particular time, an embodiment may determine the media content that will be or was active at the specified time. As an example, if a user says "save the video that will start in ten minutes" an embodiment may determine what video will be playing in ten minutes and will save the video. Determining what will be or was active may include accessing other sources, as explained in or more detail below. Alternatively, an embodiment may "rewind" the media content to the specified time point or may wait until the time point has occurred or elapsed and then identify the media content associated with that time point. As an example, the user may know that a particular webcast will be airing at 10:00 a.m. and may provide a trigger phrase indicating that an embodiment should perform an action with respect to the webcast. An embodiment may then take an action when it identifies that the time is 10:00 a.m. As another example, a user may be listening to a talk show and may have to leave before completion of the talk show. The user may provide a trigger to record the entire show. Accordingly, an embodiment may "rewind" and start recording the talk show from the beginning.

In an embodiment, identifying the active media content may include identifying characteristics or attributes of the active media content. The attributes may include metadata, title, artist, genre, time, date, album, year, lyrics, phrases, images, producer, station playing the media content, channel associated with the media content, or the like. For example, an embodiment may identify a particular audio media file currently playing using one or more attributes or characteristics of the song. For example, if a song is playing on a satellite, radio, or streaming service, an embodiment may identify the active media by accessing attributes of the active media file, using song recognition software, or the like. The attributes of the active media file may be stored in the cloud, on the user device, on the active media file data storage system, or the like. The attributes may be preprogrammed by the original artist, by the broadcast company, or by the user.

In an embodiment, identifying the active media content may include accessing a schedule corresponding to the active media content. For example, media providers may broadcast preprogrammed or prerecorded media in particular time slots and may provide a guide or program schedule identifying the active media content that will be aired at the particular time slot. Accessing a schedule may help to identify the active media content that the user has selected. For example, a user may use a trigger word and an embodiment may access the schedule of the broadcast service to identify which active media file is currently airing, aired at the identified time, or will be airing at the identified time. Thus, when the user provides a trigger word, an embodiment may access a schedule, and an embodiment may identify the active media based upon the schedule. The schedule may be stored in the cloud, the broadcast provider servers, on the user device, within an application, on a program, or the like.

In an embodiment, the identifying active media content comprises identifying a channel of the active media content. For example, if a user is listening to a satellite radio channel and the user uses a trigger word, an embodiment may identify the satellite radio station or channel that is currently playing and may associate the active media file with that particular satellite radio station. The channels may be from any broadcast source such as radio, satellite, cable, streaming, or the like. The source of the broadcast may be from commercial providers, user created media lists, or the like. And the channel information may be obtained from the commercial provider, a user created list, a cloud based storage. The channel information may be in a predetermined stored format or be broadcast in a real-time stream of data.

If active media content cannot be identified at 302, no action may be taken by the system at 303. For example, if an embodiment cannot identify the active media content, an embodiment may take no action. Alternatively, an embodiment may provide an indication to the user that the active media content cannot be identified or request the user to provide additional input. As another example, the user may have other preprogrammed words that perform other functions in relation to the device (e.g., a wake-up word for a digital assistant, trigger words for performing actions not related to active media content, etc.). Accordingly, an embodiment may differentiate between the trigger word for identification of the active media content and other words and not perform an action with respect to the active media content if a different trigger word is received.

If the active media content can be identified at 302, an embodiment may perform an action with respect to the active media content at 304. Once the active media content is identified, many actions may be taken as disclosed in the embodiments below. The action taken may be based in part on the trigger word received, as discussed briefly above. In other words, one trigger word may cause one action to be taken, while a different trigger word may cause a different action to be taken. In an embodiment, the performing action comprises associating the active media with the user. For example, if a user is watching TV and cannot finish the show, an embodiment may identify the active media file and associate the media file with the user. Thus, when the user turns the device back on, returns, or accesses another device that can play the media content, an embodiment may identify the user and notify the user of the recorded media content, that the media content can be found on a different channel at a different time, or the like.

Additionally or alternatively, an embodiment may associate the active media file with one or more users, or even a predetermined group of users. Thus, when any of the users access a device that can play the media content, an embodiment may notify the user of the media file and different actions that can be taken with respect to the media file. Identification of a user may be completed using different user identification techniques, for example, through a personal profile, an IP address, unique identifier on a device, login name, payment information, voice recognition, physical feature recognition, email account, social media account, user credentials, facial recognition, or the like.

In an embodiment, a notification related to the active content may be provided to a user. For example, if a user hears a song and a trigger word is used, an embodiment may provide the user with a notification providing identification of the active media file. As discussed above, identification of the active media file, and therefore, the notification may include attributes relating to the active media file. The notification attributes may include metadata, title, artist, genre, time, date, album, year, lyrics, phrases, images or the like. As an example, an embodiment may send a text message, email message, pop-up notification, or the like, to the user providing details of the identification of the media file. The notification may be generated and/or stored in a user device, in the cloud, in a provider database, or the like. The notification may be stored permanently or for only a period of time. In one embodiment, the notification may be sent to the user immediately after the trigger word is used, or alternatively, the notification may have a lag time. The lag time may be preset by a user, or may occur at a time when the user has time to attend to the notification.

In one embodiment, the notification may be a reminder to search for the active media content. For example, the notification may tell the user to search for an active media file at a later time, for example, using the attributes included in the notification. In one embodiment, the notification may include providing information related to the media file to the user. For example, an embodiment may, upon identifying the media file and associating it with the user, provide the user with a notification that the media file may be accessed elsewhere. In one embodiment, the notification may include a link to an active media file. The notification may be an audible alert (e.g., a voice, a beep, etc.), haptic feedback (e.g., vibration, pulse, etc.), a visible indication (e.g., a light, icon, display message, etc.), or another other type of notification. The notification may be a message sent to the user via email, SMS message, on a social media site, in a media file library, or the like.

The notification may be provided on or by the device that originally played the active media file, or alternatively, may be on a device that did not play the active media file. For example, the notification may be sent from one device to another through a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), or the like.

In an embodiment, the action performed at 304 may include recording the active media file. The recording may be an entire media file or a portion of a media file. Whether the entire media file is recorded or merely a portion may be dependent on the trigger word that was received. The recording may occur at the user device, which may be the user device that originally accessed the active media file or upon another user device or devices. Alternatively, the recording may be performed at a cloud storage unit, remote storage device, or the like. The recording may include metadata included with an active media file. The recording may be a link to another device (i.e., user device, cloud storage, or broadcast storage) where the active media file is stored.

This recording may then be sent to the user, stored for access at a later time, a link to the recording may be sent to the user, or the like. The user may then access the recording or the link to the recording and the recording may be subsequently played. The playing of an active media file may be on the device that originally accessed an active media file. Alternatively, or additionally, the playing of an active media file may be on a device that did not access the original active media file, for example, the playback may be at a different user device, from a cloud source, or the like.

The various embodiments described herein thus represent a technical improvement to conventional active media content systems. The systems and methods as described herein provide users with a technique for performing an action with respect to active media content that is not possible with conventional techniques. The user may then access either information related to the active media content or the actual active media content at a later time. Rather than missing the end of a show or media file, a user can be assured that they can access the media file at a later time and will not forget the details associated with the media file. Using the techniques as described herein, the user does not have to perform time consuming and cumbersome steps to take action with respect to the media content. Rather, the user simply provides a trigger word and the system performs the desired action, which may include notifying the user of the performed actions.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, etcetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, from an identified user, user input comprising a trigger event, wherein the trigger event is selected by and unique to the identified user and, at the time of selection of the trigger event, the identified user identifies an action to correspond to and be performed upon receipt of the trigger event, wherein different trigger events of the identified user are associated with different actions to be performed, wherein the selected trigger event is associated with the identified user stopping consumption of active media content;
   identifying, in response to the user input, the active media content and a time in the active media content the identified user stopped consuming the active media content, wherein the active media content is not in a library of the identified user at the time of receiving the trigger event;
   performing, based upon the trigger event and the identified user, an action with respect to the active media content, wherein the action performed is the action corresponding to the trigger event and identified by the identified user based upon the trigger event, wherein the performing comprises associating the active media content with the identified user, and
   notifying the user of an upcoming broadcast of the active media content, wherein an upcoming broadcast is determined based at least in part by a broadcast schedule.

2. The method of claim 1, wherein the active media content comprises audio media content and wherein the identifying active media content comprises identifying a particular audio media file currently playing.

3. The method of claim 1, wherein the identifying active media content comprises accessing a schedule corresponding to the active media content.

4. The method of claim 1, wherein the identifying active media content comprises identifying a channel of the active media content.

5. The method of claim 1, wherein the performing an action comprises associating the active media content with the user.

6. The method of claim 5, further comprising providing a notification related to the active media content to the user.

7. The method of claim 6, wherein the providing a notification comprises providing a reminder to search for the active media content.

8. The method of claim 1, wherein the performing an action comprises recording the active media content.

9. The method of claim 8, wherein the recording the active media content comprises recording a subsequent playing of the active media content.

10. The method of claim 1, wherein the receiving user input comprises receiving user input at a virtual assistant on an information handling device.

11. An information handling device, comprising:
    at least one processor;
    a memory device that stores instructions executable by the processor to:
    receive, from an identified user, user input comprising a trigger event, wherein the trigger event is selected by and unique to the identified user and, at the time of selection of the trigger event, the identified user identifies an action to correspond to and be performed upon receipt of the trigger event, wherein different trigger events of the identified user are associated with different actions to be performed, wherein the selected trigger event is associated with the identified user stopping consumption of active media content;
    identify, using at least one processor, the active media content and a time in the active media content the identified user stopped consuming the active media content, wherein the active media content is not in a library of the identified user at the time of receiving the trigger event;
    perform, based upon the trigger event and the identified user, an action with respect to the active media content, wherein the action performed is the action corresponding to the trigger event and identified by the identified user based upon the trigger event, wherein the performing comprises associating the active media content with the identified user; and
    notify the user of an upcoming broadcast of the active media content, wherein an upcoming broadcast is determined based at least in part by a broadcast schedule.

12. The information handling device of claim 11, wherein the active media content comprises audio media content and wherein the identifying active media content comprises identifying a particular audio media file currently playing.

13. The information handling device of claim 11, wherein the identifying active media content comprises accessing a schedule corresponding to the active media content.

14. The information handling device of claim 11, wherein the identifying active media content comprises identifying a channel of the active media content.

15. The information handling device of claim 11, wherein the performing an action comprises associating the active media content with the user.

16. The information handling device of claim 15, further comprising providing a notification related to the active media content to the user.

17. The information handling device of claim 16, wherein the providing a notification comprises providing a reminder to search for the active media content.

18. The information handling device of claim 11, wherein the performing an action comprises recording the active media content.

19. The information handling device of claim 11, wherein the receiving user input comprises receiving user input at a virtual assistant on an information handling device.

20. A product, comprising:
   a storage device that stores code, the code being executable by a processor and comprising:
   code that receives, from an identified user, user input comprising a trigger event, wherein the trigger event is selected by and unique to the identified user and, at the time of selection of the trigger event, the identified user identifies an action to correspond to and be performed upon receipt of the trigger event, wherein different trigger events of the identified user are associated with different actions to be performed, wherein the selected trigger event is associated with the identified user stopping consumption of active media content;
   code that identifies, using at least one processor, the active media content and a time in the active media content the identified user stopped consuming the active media content, wherein the active media content is not in a library of the identified user at the time of receiving the trigger event;
   code that performs, based upon the trigger event and the identified user, an action with respect to the active media content, wherein the action performed is the action corresponding to the trigger event and identified by the identified user based upon the trigger event, wherein the performing comprises associating the active media content with the identified user; and
   code that notifies the user of an upcoming broadcast of the active media content, wherein an upcoming broadcast is determined based at least in part by a broadcast schedule.

* * * * *